United States Patent [19]
Nicholas et al.

[11] Patent Number: 5,936,030
[45] Date of Patent: Aug. 10, 1999

[54] POLYETHER COPOLYMERS AND A PROCESS FOR PREPARING THEM

[75] Inventors: Christian Vaughan Nicholas, Middlesex; Malcolm Donald Purbrick, Herts, both of United Kingdom

[73] Assignee: Nanosystems, King of Prussia, Pa.

[21] Appl. No.: 08/836,819

[22] PCT Filed: Dec. 21, 1994

[86] PCT No.: PCT/EP94/04261

§ 371 Date: Aug. 14, 1997

§ 102(e) Date: Aug. 14, 1997

[87] PCT Pub. No.: WO96/19523

PCT Pub. Date: Jun. 27, 1996

[51] Int. Cl.$^6$ ............................. C08G 65/32; C08G 81/00
[52] U.S. Cl. ........................... 524/612; 524/792; 525/397; 525/425
[58] Field of Search ..................................... 528/425, 397; 524/792, 612

[56] References Cited

FOREIGN PATENT DOCUMENTS 2240320  10/1987  Japan ...................................... 528/397

*Primary Examiner*—Andrew E. C. Merriam
*Attorney, Agent, or Firm*—Foley & Lardner

[57] ABSTRACT

A block copolymer containing one or more polyoxyethylene blocks and one or more polyoxy(higher alkylene) blocks, wherein at least some of the blocks are linked together by an oxymethylene group, can be prepared by reacting one or more dihydroxy terminated polymers selected from poly (ethylene glycol), poly(higher alkylene glycol), and block copolymers thereof in solution with a dihalomethane in the presence of a base. Such copolymers can be used as surfactants and surface modifiers. The reaction can be conducted at ambient temperature, and does not require the addition of heat.

8 Claims, No Drawings

POLYETHER COPOLYMERS AND A PROCESS FOR PREPARING THEM

FIELD OF THE INVENTION

The invention relates to polyoxyalkylene block copolymers and a process for their preparation.

BACKGROUND OF THE INVENTION

Dihydroxy terminated triblock copolymer surfactants are known having the general structure $H-(E)_a(P)_b(E)_a-OH$ wherein E represents oxyethylene and P represents oxypropylene. Such nonionic surfactants are commercially available e.g. Pluronic™ surfactants.

U.S. Pat. No. 4,072,704 describes the preparation of polyoxyalkylene block copolymer surfactants by reacting individual blocks of polymers and copolymers of alkylene oxides with formaldehyde or a dialkyl carbonate. For example, the surfactants can contain polyoxyethylene and polyoxypropylene polymers linked by formal or carbonate groups.

PROBLEM TO BE SOLVED BY THE INVENTION

Alternative polyoxyalkylene block copolymers and a process for their production are required. In particular, a simpler process of preparation which makes it possible to prepare copolymers of higher molecular weight is desired.

SUMMARY OF THE INVENTION

The invention provides a block copolymer containing one or more polyoxyethylene blocks and one or more polyoxy(higher alkylene) blocks wherein at least some of the blocks are linked together by a linking group characterised in that the linking group is an oxymethylene group.

The invention also provides a process for preparing a block copolymer containing one or more polyoxyethylene blocks and one or more polyoxy(higher alkylene) blocks characterised in that one or more dihydroxy terminated polymers selected from poly(ethylene glycol), poly(higher alkylene glycol) and block copolymers thereof are reacted in solution with a dihalomethane in the presence of a base.

ADVANTAGEOUS EFFECT OF THE INVENTION

The reaction can be carried out using an excess of the dihalomethane as a solvent for the other reactants. Heating is not required as the reaction proceeds at ambient temperature.

Polyoxyalkylene block copolymers can be prepared having a higher molecular weight than those prepared using other processes.

The methylene oxide linking groups closely resemble the chemical structure of the other groups forming the polymer blocks.

DETAILED DESCRIPTION OF THE INVENTION

Preferred copolymers of the invention include those wherein the polyoxy(higher alkylene) blocks are selected from polyoxypropylene and polyoxybutylene blocks.

In one embodiment of the invention, block copolymers are provided having the following repeating units in random order

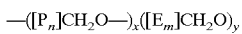

wherein

P is oxypropylene;
E is oxyethylene;
n is an integer from 2 to 70, preferably from 4 to 20;
m is an integer from 2 to 250, preferably from 9 to 20;
x is an integer from 1 to 100, preferably from 1 to 10; and,
y is an integer from 1 to 100, preferably from 1 to 50.

In another embodiment of the invention, block copolymers are provided having the following repeating units

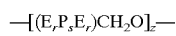

wherein

P is oxypropylene;
E is oxyethylene;
r is an integer from 2 to 135, preferably from 75 to 135;
s is an integer from 15 to 65, preferably from 30 to 50; and,
z is an integer from 2 to 50, preferably from 5 to 20.

The molecular weight of a block copolymer of the invention as measured by gel permeation chromatography against poly(oxyethylene) standards may range from 10,000 to 500,000, preferably from 50,000 to 250,000.

The polymers can be prepared by a process wherein one or more dihydroxy terminated polymers selected from poly(ethylene glycol), poly(higher alkylene glycol) and block copolymers thereof are reacted in solution with a dihalomethane in the presence of a base.

Examples of suitable solvents in which the reagents can be dissolved include dihalomethanes and other known organic solvents such as benzene, chlorobenzene and toluene or mixtures thereof.

Preferably, an excess of the dihalomethane reagent is used as the solvent. Even though the dihalomethane is used in an amount which can far exceed the stoichiometric amount needed to couple with the polymeric reactants, products of high molecular weight can still be achieved.

Although any dihalomethane or mixture thereof may be used such as dichloromethane, dibromomethane or diiodomethane, the preferred dihalomethane is dichloromethane.

The required alkaline reaction conditions may be obtained by incorporating one or more bases such as sodium hydroxide and potassium hydroxide.

Examples of the dihydroxy terminated polymer starting materials include the polyethylene glycols (PEGs) and the polypropylene glycols (PPGs) which are available commercially. Specific examples include PEG 400, PEG 6000 and PPG 1000 for which the number associated with the name "PEG" or "PPG" indicates the average molecular weight of the polymer and is proportional to the average number of repeating oxyethylene or oxypropylene units in the polymer. Preferred polyalkylene glycols have molecular weights ranging from 200 to 10,000.

Further examples of the dihydroxy terminated polymer starting materials include the dihydroxy terminated E-P-E triblock copolymers of poly(oxyethylene) (E) and poly(oxypropylene) (P) which are commercially available in the form of Pluronic™ surfactants. Preferred triblock copolymers have molecular weights ranging from 4,000 to 15,000.

The copolymers of the invention contain both hydrophilic polyoxyethylene blocks and hydrophobic polyoxy(higher alkylene) blocks. The balance between the hydrophilicity and hydrophobicity of the copolymers can be adjusted by appropriate choice of starting materials to give the optimum physical and chemical characteristics required. In addition to being suitable for a variety of surfactant applications such as antifoaming agents and dispersing aids, the block copolymers may be used as surface modifiers e.g. to reduce the level of protein adsorption to polystyrene. The copolymers are suited for use as biocompatible materials in biomedical devices.

The invention is illustrated but not limited by the following Examples.

EXAMPLE 1

An oxymethylene linked, multiblock copolymer was prepared by the reaction of an $E_{76}P_{30}E_{76}$ triblock copolymer of poly(oxyethylene) ($E_{76}$) and poly(oxypropylene) ($P_{30}$), having an average molecular weight of 8,400, with dichloromethane in the presence of potassium hydroxide.

Finely ground potassium hydroxide (20 g) was mixed with dichloromethane (250 ml) under a nitrogen atmosphere at room temperature in a one liter resin kettle equipped with a condenser and a mechanical stirrer. To this was added the triblock copolymer (20 g) dispersed in dichloromethane (50 ml).

The whole was stirred for approximately two hours, then additional dichloromethane (500 ml) was added to reduce the viscosity of the polymer solution. The solution was filtered through diatomaceous earth and then rotary evaporated under vacuum to give a polymer.

The polymer was characterised by gel permeation chromatography (GPC). Dimethyl formamide (DMF) eluant and styragel columns were employed, calibrated with poly (oxyethylene) standards. Molecular weights and molecular weight distributions were obtained from the GPC curve by reference to this calibration. Values of Mw~150,000 and Mw/Mn~2 were obtained. The yield was >95%.

EXAMPLE 2

Oxymethylene linked $E_{129}P_{56}E_{129}$ was prepared according to the method described in Example 1 using the following reagents:

| | |
|---|---|
| Potassium hydroxide | 20 g |
| Dichloromethane | 250 ml |
| $E_{129}P_{56}E_{129}$ | 20 g (in 50 ml dichloromethane) |

The polymer was isolated as described in Example 1. Values of Mw~70,000 and Mw/Mn~2 were obtained from GPC measurements. The yield was >95%.

EXAMPLE 3

Oxymethylene linked $E_9P_{56}E_9$ was prepared according to the method described in Example 1 using the following reagents:

| | |
|---|---|
| Potassium hydroxide | 20 g |
| Dichloromethane | 30 ml |
| $E_9P_{56}E_9$ | 16 g (in 15 ml dichloromethane) |

The polymer was isolated as described in Example 1. Values of Mw~20,000 and Mw/Mn~2 were obtained from GPC measurements. The yield was >80%.

EXAMPLE 4

An oxymethylene linked, multiblock copolymer was prepared by the reaction of polyethylene glycol with an average molecular weight of 400 (PEG 400) and polypropylene glycol with an average molecular weight of 1000 (PPG 1000) with dichloromethane in the presence of potassium hydroxide.

The polymer was prepared according to the method described in Example 1 using the following reagents:

| | |
|---|---|
| Potassium hydroxide | 50 g |
| Dichloromethane | 50 ml |
| PEG 400 | 10 g |
| PPG 1000 | 45 g | i.e. 35.7 mol % PEG and 64.3 mol % PPG 1000.

The polymer was isolated as described in Example 1. Values of Mw~11,000 and Mw/Mn~2 were obtained from GPC measurements. The yield was >95%.

EXAMPLE 5

An oxymethylene linked, multiblock copolymer was prepared by the reaction of polyethylene glycol with an average molecular weight of 400 (PEG 400) and polypropylene glycol with an average molecular weight of 1000 (PPG 1000) with dichloromethane in the presence of potassium hydroxide.

The polymer was prepared according to the method described in Example 1 using the following reagents:

| | |
|---|---|
| Potassium hydroxide | 50 g |
| Dichloromethane | 50 ml |
| PEG 400 | 40 g |
| PPG 1000 | 11.25 g | i.e. 90 mol % PEG and 10 mol % PPG 1000.

The polymer was isolated as described in Example 1. Values of Mw~50,000 and Mw/Mn~2 were obtained from GPC measurements. The yield was >95%.

EXAMPLE 6

An oxymethylene linked, multiblock copolymer was prepared by the reaction of an $E_rB_sE_r$ triblock copolymer wherein B is oxybutylene, having an average molecular weight of 4,200, with dichloromethane in the presence of sodium hydroxide.

The copolymer was prepared according to the method described in Example 1 using the following reagents:

| | |
|---|---|
| Sodium hydroxide | 20 g |
| Dichloromethane | 160 ml |
| $E_{37}B_{11}E_{37}$ | 10 g (in 50 ml dichloromethane) |

The polymer was isolated as described in Example 1. Values of Mw~243,000 and Mw/Mn~2 were obtained from GPC measurements. The yield was >95%.

EXAMPLE 7

An oxymethylene linked, multiblock copolymer was prepared by the reaction of an $E_rP_sE_r$ triblock copolymer, commercially available as Pluronic™ F108 and a polethylene glycol having an average molecular weight of 6000 (PEG 6000) with dichloromethane in the presence of sodium hydroxide.

The copolymer was prepared according to the method described in Example 1 using the following reagents:

| | |
|---|---|
| Sodium hydroxide | 30 g |
| Dichloromethane | 200 ml |
| $E_{129}P_{56}E_{129}$ | 15 g (in dichloromethane*) |
| PEG 6000 | 15 g (in dichloromethane*) |

*The $E_{129}P_{56}E_{129}$ and PEG 6000 were used as a mixture dissolved in 100 ml dichloromethane.

The polymer was isolated as described in Example 1. Values of Mw~170,500 and Mw/Mn~2 were obtained from GPC measurements. The yield was >95%.

We claim:

1. A block copolymer having a molecular weight from about 10,000 to about 500,000 as determined by gel permeation chromatography and having the following repeating units in random order:

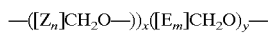

wherein

Z is oxypropylene;

E is oxyethylene;

n is an integer from 2 to 70;

m is an integer from 2 to 250;

x is an integer from 1 to 100; and y is an integer from 1 to 100.

2. A block copolymer having a molecular weight from about 10,000 to about 500,000 as determined by gel permeation chromatography and having the following repeating units in random order:

wherein

Z is oxypropylene;

E is oxyethylene;

r is an integer from 2 to 135;

s is an integer from 15 to 65; and z is an integer from 2 to 100.

3. A process for preparing a high molecular weight block copolymer containing one or more polyoxyethylene blocks and one or more polyoxy(higher alkylene) blocks, wherein: (a) the molecular weight of the block copolymer is from about 10,000 to about 500,000 as determined by gel permeation chromatography; and (b) the process does not require the addition of heat, wherein the process comprises reacting one or more dihydroxy terminated polymers selected from the group consisting of poly(ethylene glycol), poly(higher alkylene glycol), and block copolymers thereof in solution with a dihalomethane in the presence of a base.

4. A process according to claim 1, wherein the one or more dihydrocy-terminated triblock copolymers have molecular weights ranging from 4,000 to 15,000.

5. A process for preparing a copolymer according to claim 3, wherein one or more dihydroxy-terminated triblock copolymers of ethylene glycol and propylene glycol or butylene glycol, if desired, including one or more dihydroxy-terminated polymers of poly(ethylene glycol) and/or poly(propylene glycol), are reacted in solution with a dihalomethane in the presence of a base.

6. The process of claim 4, wherein the dihalomethane is dichloromethane.

7. The process of claim 3, wherein the molecular weight of the block copolymer is from about 50,000 to about 250,000.

8. The process of claim 3, wherein the process is conducted at ambient temperature.

* * * * *